United States Patent [19]
Decore et al.

[11] Patent Number: 5,981,872
[45] Date of Patent: Nov. 9, 1999

[54] METHOD AND DEVICE FOR MORE FIRMLY SECURING TO TRUNKING AN ACCESSORY OF ANY KIND TO BE ATTACHED TO THE BASE THEREOF BY NESTING OVER IT

[75] Inventors: Bertrand Decore, La Chapelle Saint Aubin; François Perrignon De Troyes, Mont Saint Jean, both of France

[73] Assignees: Legrand; Legrand SNC, both of Limoges, France

[21] Appl. No.: 09/000,831

[22] Filed: Dec. 30, 1997

[30] Foreign Application Priority Data

Dec. 31, 1996 [FR] France .................................. 96 16300

[51] Int. Cl.⁶ ...................................... H02G 3/04

[52] U.S. Cl. .............................. 174/48; 29/453; 174/101; 439/210

[58] Field of Search .................. 174/48, 49, 82, 174/92, 101; 29/453; 220/3.2; 439/210

[56] References Cited

U.S. PATENT DOCUMENTS

| | | |
|---|---|---|
| 4,951,716 | 8/1990 | Tsunoda et al. ..................... 174/101 X |
| 5,206,972 | 5/1993 | Nudelmont et al. .................. 174/49 X |
| 5,406,762 | 4/1995 | Buard .................................... 174/48 X |
| 5,442,885 | 8/1995 | Laven et al. .......................... 29/453 X |
| 5,523,529 | 6/1996 | Holliday .............................. 174/101 |
| 5,629,496 | 5/1997 | Navazo .................................... 174/48 |
| 5,747,733 | 5/1998 | Woods et al. ............................ 174/48 |

FOREIGN PATENT DOCUMENTS

| | | |
|---|---|---|
| 7701076 | 5/1977 | Germany . |
| 8409752 | 8/1984 | Germany . |

*Primary Examiner*—James F. Coan
*Attorney, Agent, or Firm*—Young & Thompson

[57] ABSTRACT

An accessory of any kind, for example an end-cap, is designed to be fitted to the base of trunking. To make the retention of the end-cap to the trunking more firm, at least one thickness-increasing device is fitted to its base, before the end-cap, and forms a localized increased thickness on the base. Applications include moldings.

23 Claims, 2 Drawing Sheets

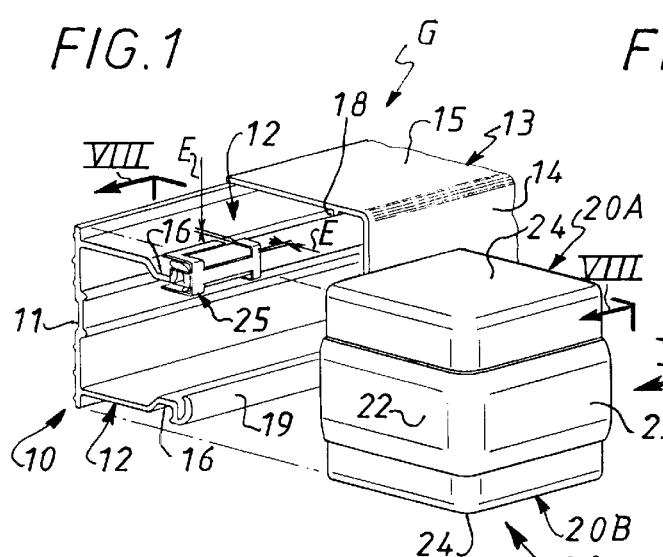
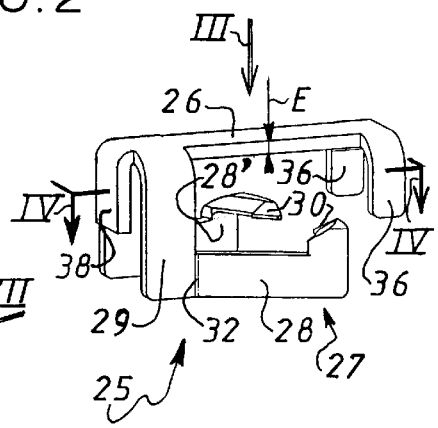
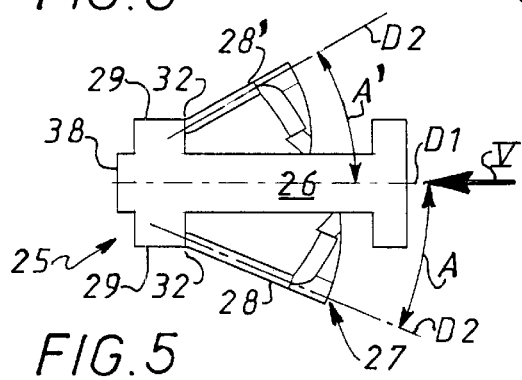
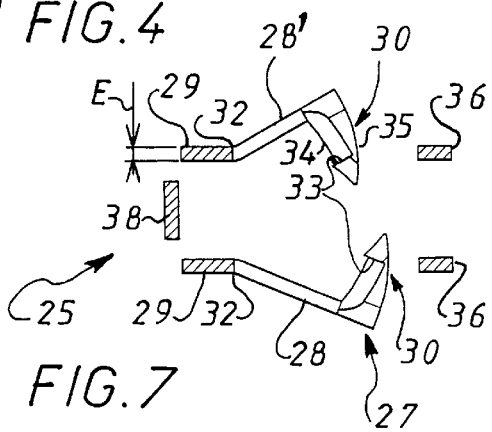
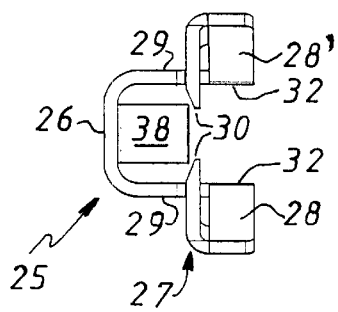
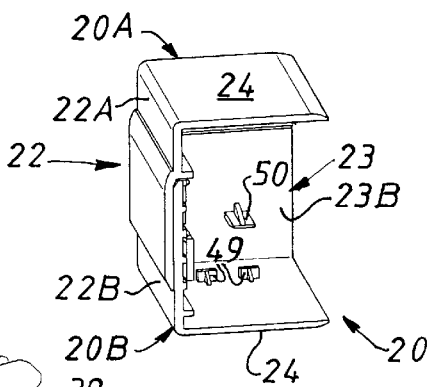
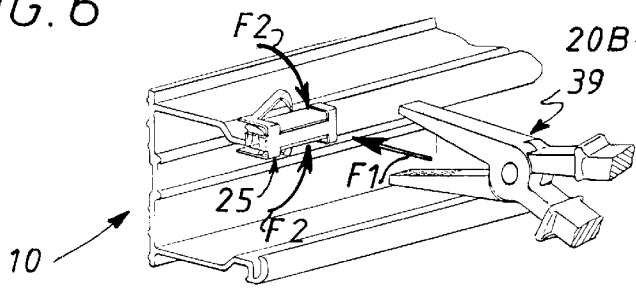

METHOD AND DEVICE FOR MORE FIRMLY SECURING TO TRUNKING AN ACCESSORY OF ANY KIND TO BE ATTACHED TO THE BASE THEREOF BY NESTING OVER IT

BACKGROUND OF THE INVENTION

1. Field of the Invention

The present invention concerns trunking, that is to say extrusions or like members made up of a base with an open cross-section and a cover.

It is more particularly, but not necessarily exclusively, directed to trunking adapted to accommodate and to protect electrical equipment of any kind.

For example, it can be small-size trunking used only to accommodate and to protect electrical conductors of any kind, known in the art as moldings.

However, it can also be trunking of sufficient size also to accommodate and to protect electrical equipment of any kind, such as socket outlet bases, for example.

2. Description of the Prior Art

The base, which is made from a synthetic material, is generally manufactured by extrusion.

The base generally, although not necessarily exclusively, has a U-profile external cross-section with a median baseplate, two lateral flanges and possibly one or more internal partitions parallel to the latter.

It is shaped to receive a cover or a cover section which is nested over it, usually clipped to it and adapted to close it longitudinally over at least part of its length and/or, locally substituted for a cover or cover section of this kind, an accessory of any kind, such as an end-cap adapted to close it transversely at one end, for example, and one or more supports adapted to receive electrical equipment.

The problem that arises here is that, given inevitable manufacturing tolerances, securing an accessory of this kind onto a base of this kind, and thus onto the corresponding trunking, can be somewhat haphazard and, given the method of fabricating the base by extrusion, it is difficult to provide on the latter any disparity or irregularity of a kind that can secure it more firmly.

To comply with the sealing provisions of the applicable standards, it is important for it to be secured sufficiently firmly to resist impact, whether the impact is applied directly to the accessory in question or is transmitted to it through the trunking itself or any other accessory also attached to the latter.

A general object of the present invention is a method and a device that meet this requirement in a very simple manner.

SUMMARY OF THE INVENTION

In accordance with the invention, at least one thickness-increasing device is fitted beforehand to the base to form a locally increased thickness of the base.

A thickness-increasing device of this kind provides a sufficiently firm connection between the accessory and the base of the trunking for the retention of the accessory to the trunking to satisfy the sealing provisions of the applicable standards.

The thickness-increasing device of the invention preferably includes a plate adapted to be superposed locally on the base of the trunking to be equipped and fixing means, for example anchor means, adapted to enable it to be attached to the base.

It is preferably in the general form of a bracket advantageously adapted to be fitted from the front, perpendicularly to the lengthwise direction of the base to be equipped.

This facilitates fitting it, specially when the trunking to be equipped is already itself attached to a support of any kind.

The features and advantages of the invention will emerge from the following description given by way of example with reference to the accompanying diagrammatic drawings.

BRIEF DESCRIPTION OF THE DRAWINGS

FIG. 1 is a partial exploded perspective view of trunking to the base of which is locally attached a thickness-increasing device in accordance with the invention and an accessory also to be attached to this base.

FIG. 2 is a perspective view to a larger scale of the thickness-increasing device of the invention, shown in isolation.

FIG. 3 is a plan view of the thickness-increasing device as seen in the direction of the arrow III in FIG. 2.

FIG. 4 is a view of it in longitudinal section taken along the line IV—IV in FIG. 2.

FIG. 5 is an end view of it as seen in the direction of the arrow V in FIG. 3.

FIG. 6 is a partial perspective view derived from that of FIG. 1 showing the fitting of the thickness-increasing device of the invention to the base of the trunking to be equipped.

FIG. 7 is a perspective view of the accessory to be attached to the base of the trunking to be equipped, as seen from the inside, in the direction of the arrow VII in FIG. 1.

DETAILED DESCRIPTION OF THE PREFERRED EMBODIMENT

Figure 8:
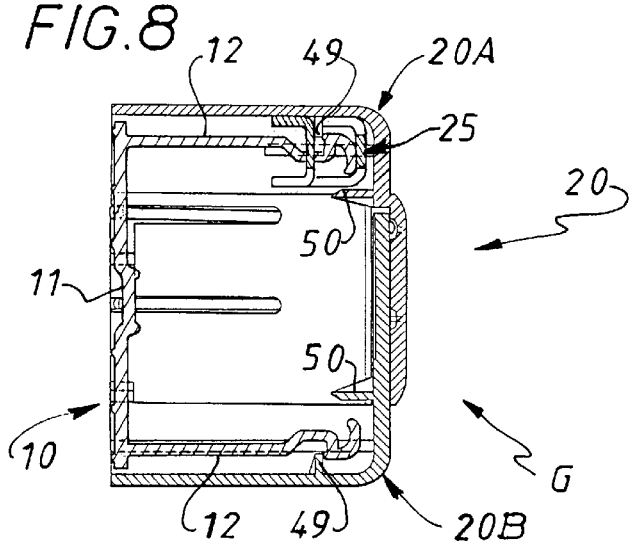
FIG. 8 is a view of the trunking equipped with the thickness-increasing device of the invention and the accessory attached to its base to a different scale and in cross-section taken along the line VIII—VIII in FIG. 1.
Figure 9:
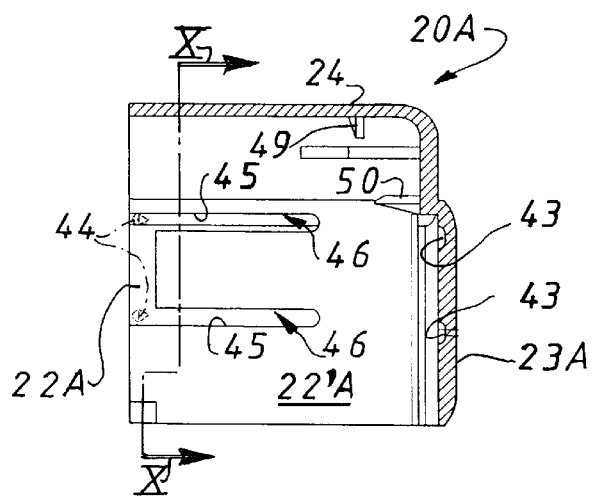
FIG. 9 is a cross-sectional view derived from that of FIG. 8 of one of the component parts of the accessory.
Figure 10:
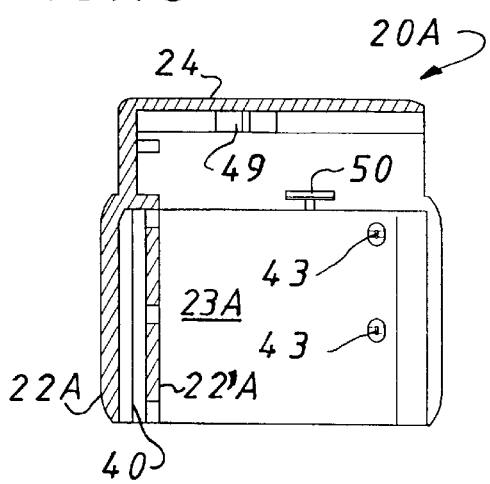
FIG. 10 is a view of it in cross-section taken along the broken line X—X in FIG. 9.
Figure 11:
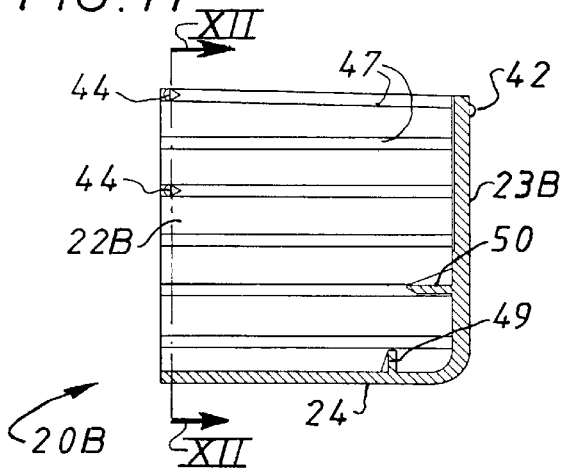
FIG. 11 is a cross-sectional view derived from that of FIG. 8 of the other component part of the accessory concerned.
Figure 12:
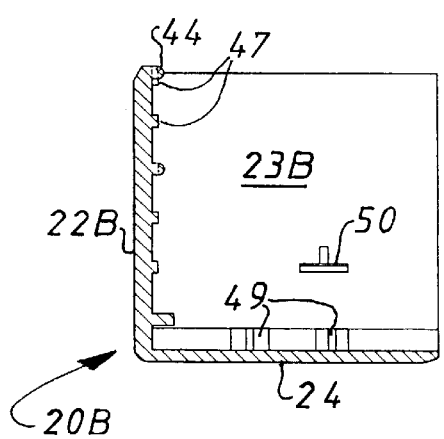
FIG. 12 is a view of it in cross-section taken along the line XII—XII in FIG. 11.

As shown in the figures, trunking G has a base 10 with a U-profile exterior cross-section, a median baseplate 11 and two lateral flanges 12.

The median baseplate 11 of the trunking 10 is designed to be applied to any kind of support, for example a wall, not shown.

In the embodiment shown, the trunking G has a relatively small height and a relatively small width, like the type of trunking usually called a molding, and its base 10 has no internal partitions.

However, it goes without saying that the base 10 could equally well incorporate one or more such partitions.

Be this as it may, it is a synthetic material extrusion.

In the usual way, the base 10 is associated with a cover 13 for closing it, the combination forming the trunking G.

Like the base 10, the cover 13 is a synthetic material extrusion.

In the embodiment shown, the cover is a capping type cover, for example, that is to say a cover having, in addition to a front wall 14, two lateral flanges 15 adapted to engage over the outside of the base 10, over the full height of the latter.

Clipping means are naturally provided for securing the cover 13 transversely to the base 10.

In the embodiment shown, the clipping means are obtained by virtue of the fact that, on the one hand, each of the lateral flanges 12 of the base 10 incorporates an outwardly facing longitudinal groove 16 and, on the other hand, each of the lateral flanges 15 of the cover 13 includes a longitudinal rib 18 projecting from its inside face and adapted to engage in the groove 16 on the corresponding lateral flange 12 of the base 10.

In the embodiment shown, each of the lateral flanges 12 of the base 10 has an inward facing right-angle lip 19 at its edge and substantially parallel to the median baseplate 11, to improve the seating of the cover 13.

The above provisions are well known in themselves and as they do not of themselves constitute any part of the present invention they will not be described in more detail here.

In addition to the cover 13, the base 10 can receive an accessory of any kind, which nests in it.

The figures show, by way of example, the situation in which this accessory is an end-cap 20 to be attached to the end of the trunking G, and therefore of the base 10, to close the trunking G transversely.

The end-cap 20, which will be described in more detail hereinafter, is locally substituted for the cover 13, although it can possibly at least partially overlap the latter, and therefore has, in addition to a transverse wall 22 adapted to close the base 10 transversely, a front wall 23 and two lateral walls 24.

Although this end-cap 20 can be secured transversely to the base 10 by clipping, like the cover 13, the same does not apply to its longitudinal retention.

In accordance with the invention, to strengthen this retention, the base 10 of the trunking G to be equipped is fitted, before the end-cap 20, with at least one thickness-increasing device 25 adapted to form a locally increased thickness E on the base 10.

In the embodiment shown a thickness-increasing device 25 of this kind is attached to the free edge of at least one of the lateral flanges 12 of the base 10.

As shown here, for example, only one of the lateral flanges 12 is equipped in this way with a thickness-increasing device 25 of this kind.

When, as here, the intention is to reinforce the retention of an end-cap 20, the thickness-increasing device 25 is disposed at the end of the lateral flange 12 to which it is attached.

As is the case in the embodiment shown, the thickness-increasing device 25 of the invention is preferably adapted to form an increased thickness E as much on the front, i.e. on the edge of the lateral flange 12 to which it is attached, as laterally, i.e. on at least one of the external and/or internal faces of the lateral flange 12.

When, as here, the accessory to be secured more firmly is an end-cap adapted to be fitted to the trunking G from the outside, to be more precise to its base 10, the required increased thickness E is preferably on the outside face of the lateral flange 12 to which the thickness-increasing device 25 of the invention is attached.

However, in the embodiment shown, the thickness-increasing device 25 of the invention is adapted to form an increased thickness E on the outside and inside faces of a lateral flange 12, so as to be attachable to either of the lateral flanges 12 of the base 10.

Moreover, in this embodiment, the thickness-increasing device 25 of the invention has the general form of a bracket adapted to fit locally over the edge of either of the lateral flanges 12.

It is therefore advantageously adapted to be fitted to the base 10 of the trunking G to be equipped from the front, perpendicularly to the lengthwise direction of the base 10, which makes it particularly easy to fit.

In the embodiment shown the thickness-increasing device 25 of the invention includes, on the one hand, a plate 26 adapted to be locally superposed on the base 10 of the trunking G to be equipped, to be more precise on the right-angle lip 19 on the lateral flange 12 concerned of the base 10, and, on the other hand, fixing means 27 which, in a manner to be described in more detail hereinafter, are adapted to attach it to the base 10.

As shown here, for example, the plate 26 is substantially plane and has a relatively elongate rectangular contour.

In the embodiment shown, the fixing means 27 are anchor means adapted to penetrate forcibly into the base 10 of the trunking G to be equipped.

To be more precise, the fixing means 27 include at least one globally deformable anchor arm 28 linked to the plate 26 by a leg 29 and provided with at least one claw 30.

As is the case in the embodiment shown, the fixing means 27 preferably include two anchor arms 28, 28' on respective opposite sides of the plate 26 and of similar construction.

For each of the anchor arms 28, 28', the leg 29 extends globally transversely and perpendicularly to the plate 26, merging with the plate 26 via a large radius.

In the embodiment shown, the two legs 29 of the thickness-increasing device 25 of the invention face each other and are substantially the same height.

As shown, for example, the legs 29 are at one end of the plate 26.

In the embodiment shown, each of the anchor arms 28, 28' extends cantilever fashion from the free end of the leg 29 carrying it and is substantially at right-angles to the latter.

The two anchor arms 28, 28' are therefore at substantially the same level relative to the plate 26, at a distance from the latter.

Moreover, they lie globally in a plane parallel to the plate 26.

However, as shown diagrammatically in FIG. 3, their lengthwise direction D2 is initially at an angle A, A' to that D1 of the plate 26 and they diverge from the latter in the direction away from the leg 29 carrying them.

In other words, the anchor arms 28, 28' initially diverge from each other, starting from the legs 29.

In the embodiment shown, each of the anchor arms 28, 28' is articulated to the leg 29 carrying it by a hinge area 32.

This hinge area 32 can be obtained from a simple capacity for deformation of the material from which the thickness-increasing device 25 of the invention is made, for example.

Here, this is a permanent deformation capacity.

Be this as it may, the hinge area 32 extends substantially perpendicularly to the plate 26 along the corresponding edge of the leg 29 concerned.

In the embodiment shown, the anchor arms 28, 28' each have only one claw 30 and this is at their free end.

For each of the anchor arms 28, 28', the claw 30 originates from one of the longitudinal edges of the anchor arm 28, 28' on which it forms a localized right-angle rim.

As shown, for example, it is on the longitudinal edge of the anchor arm 28, 28' which is nearer the plate 26.

For each of the anchor arms 28, 28', the claw 30 extends globally perpendicularly to the anchor arm 28, 28', towards the plate 26, in a plane substantially parallel to the latter.

To prevent them interfering with each other the two claws 30 are offset relative to each other from one anchor arm 28, 28' to the other.

They can be equally well offset in height or longitudinally.

In the embodiment shown, however, the two claws 30 are at the same level relative to the plate 26, at a distance from the latter, and they are therefore offset only longitudinally.

In practise this longitudinal offset is simply the result of the fact that the anchor arms 28, 28' have different lengths.

The angle A' for the shorter anchor arm 28' is therefore greater than the angle A for the longer anchor arm 28.

The two claws 30 on the two anchor arms 28, 28' have a similar or even identical construction.

Each of them is pointed at the end and has at least one transverse barb 33 at a distance from the latter.

As shown, for example, there is only one such barb 33.

At least one of the longitudinal edges 34, 35 of the claws 30 is preferably tapered like the cutting edge of a blade.

In the embodiment shown, only one of the longitudinal edges 34, 35 is tapered in this way, in practise the inside longitudinal edge 34, i.e. the longitudinal edge nearest the corresponding leg 29.

The outside longitudinal edge 35, i.e. the longitudinal edge farthest from the leg 29, has a circular contour in this embodiment, globally centered on the leg 29.

In the embodiment shown, the thickness-increasing device 25 of the invention includes two other lateral legs 36 at a distance from the legs 29 carrying the anchor arms 28, 28'.

As shown, for example, the legs 36 face each other at the opposite end of the plate 26 to the legs 29 carrying the anchor arms 28, 28'.

Like these legs 29, they extend globally transversely relative to the plate 26 and perpendicularly thereto, merging with the plate 26 via a large radius.

Moreover, their separation, i.e. the distance between them, is substantially equal to the separation of the legs 29.

However, in the embodiment shown, their height is less than that of the latter.

Finally, in the embodiment shown, the thickness-increasing device 25 of the invention has a transverse stop lug 38 transversely to the plate 26, at one end of the latter, to be more precise at the same end of the latter as the legs 29 carrying the anchor arms 28, 28'.

As shown, for example, the stop lug 38 extends the entire width of the plate 26, forming a right-angle extension of the latter, as it were.

Substantially equal to that of the legs 36, the height of this stop lug 38 is less than that of the legs 29 carrying the anchor arms 28, 28'.

The thickness-increasing device 25 of the invention is preferably in one piece, being cut and bent to shape from a metal blank.

It can be fitted as follows, for example.

Initially, and as already mentioned, the thickness-increasing device 25 is engaged from the front, in the direction of the arrow F1 in FIG. 6, over the edge of the lateral flange 12 of the base 10 of the trunking G to which it is to be attached.

It is then adjusted longitudinally in position on this lateral flange 12 so that its stop lug 38 abuts against the end of the latter.

Next, its anchor arms 28, 28' are forced towards each other, as shown diagrammatically by the arrows F2 in FIG. 6.

Pliers 39 are used for this purpose, for example.

Be this as it may, at least the claw 30 carried by the outermost anchor arm 28, 28' perforates the lateral flange 12 concerned of the base 10, which is sufficient for longitudinal and transverse retention of the thickness-increasing device 25 on this lateral flange 12.

Attached in this way to the base 10, the thickness-increasing device 25 of the invention forms a localized increased thickness E on the edge of the lateral flange 12 concerned of the base 10 and on the outside face of the latter, which is equal to the thickness E of its initial blank, that is to say, the thickness E of the plate 26 and its legs 29.

This increased thickness E is sufficient to take up any play due to manufacturing tolerances between the base 10 and the end-cap 20.

Retention of the end-cap 20 to the base 10 and thus to the trunking G is advantageously reinforced by this means.

In the embodiment shown, the end-cap 20 is in two parts 20A, 20B which individually form its two lateral walls 24 and which conjointly form its transverse wall 22 and its front wall 23, each having a respective transverse closing wall 22A, 22B and a front wall 23A, 23B.

In other words, each of these parts 20A, 20B has, in a trihedron arrangement, a transverse wall 22A, 22B, a front wall 23A, 23B and a lateral wall 24.

Nested one within the other, the two parts 20A, 20B of the end-cap 20 are adjustable in position relative to each other to adapt the end-cap 20 to different widths of the base 10 and therefore the trunking G to which it must be attached.

For example, the part 20A constitutes a female part into which the part 20B which constitutes a male part is nested by sliding it into position.

To this end, the transverse wall 22A of the part 20A is backed internally, over a portion of its width from its free edge, by an inside wall 22'A which forms with it a pocket 40 adapted to receive the transverse wall 22B of the part 20B.

To enable the necessary overlapping, the portion of the transverse wall 22A of the part 20A backed in this way by an internal wall 22'A is offset transversely outwards relative to the main part of the transverse wall 22A, and likewise the front wall 23A.

Complementary nesting means for releasably immobilizing the two parts 20A, 20B relative to each other are preferably provided between the two parts 20A, 20B.

In the embodiment shown, these locking means include a boss 42 projecting from the front wall 23B of the part 20B and adapted to cooperate by nesting type interengagement with one or other of two spaced housings 43 on the front wall 23A of the part 20A.

They further include two bosses 44 projecting from the transverse wall 22B of the part 20B and adapted to cooperate abutment fashion with corresponding shoulders 45 provided on the inside wall 22'A of the part 20A.

As shown, for example, these shoulders 45 are formed by one flank of slots 46 formed locally in the inside wall 22'A.

Moreover, in the embodiment shown, the bosses 44 project from ribs 47 in turn projecting from the transverse wall 22B of the part 20B to reinforce the transverse wall 22B.

The result of the foregoing is that, in the embodiment shown, the two component parts 20A, 20B of the end-cap 20 can occupy either of two precise stable positions relative to each other.

Moreover, in the embodiment shown, each of the component parts 20A, 20B of the end-cap 20 includes at least one stud 49 projecting from the inside face of its lateral wall 24 and adapted to enable it to be clipped into the groove 16 on the corresponding lateral flange 12 of the base 10 of the trunking G concerned.

As shown, for example, there are one stud 49 on the part 20A and two spaced studs 49 on the part 20B.

Finally, in the embodiment shown, each of the component parts 20A, 20B of the end-cap 20 has at least one lug 50 projecting from the inside face of its front wall 23A, 23B for preventing it rotating relative to the base 10 and therefore the trunking G.

As shown, for example, there is one such lug 50 on each of the two parts 20A, 20B.

Of course, the present invention is not limited to the embodiments described and shown by encompasses any variant execution of either.

Further, the field of application of the invention is not limited to the situation in which the accessory to be attached to the trunking to be equipped is an end-cap, but equally encompasses any other type of accessory.

For example, this accessory can equally well be a support adapted to receive electrical equipment of any kind.

There is claimed:

1. A method for enhancing the securement of an accessory on a trunking base member adapted to be nested on the trunking base member, comprising the steps of providing a thickness-increasing device, positioning the thickness-increasing device on a localized area of the trunking base member and fixing the thickness-increasing device in position thereon against movement in longitudinal and transverse directions relative to the trunking base member and then securing the accessory on the thickness-increasing device fixed in position on the trunking base member.

2. The method according to claim 1, wherein the trunking base member has a U-shaped profile external cross section including a median baseplate and two lateral flanges on opposite sides thereof, and wherein the positioning step comprises positioning the thickness-increasing device to a free edge of one of the lateral flanges and proximate to one end thereof.

3. The method according to claim 1, wherein the trunking base member has a U-shaped profile external cross section including a median baseplate and two lateral flanges on opposite sides thereof, and wherein the positioning step comprises positioning the thickness-increasing device proximate to one end thereof.

4. The method according to claim 1, wherein the trunking base member has a U-shaped profile external cross section including a median baseplate and two lateral flanges on opposite sides thereof, each lateral flange having laterally inner and outer surfaces and a longitudinal free edge remote from the median baseplate, wherein the thickness-increasing device has a first portion for locally superposing the longitudinal free edge and a second portion for locally superposing at least one of said inner and outer surfaces of said on lateral flange, the positioning step comprises positioning the thickness-increasing device to a free edge of one of the lateral flanges with the first portion locally superposing the longitudinal free edge and the second portion locally superposing one of the inner and outer surfaces of said one lateral flange.

5. A thickness-increasing device for enhancing the securement of an accessory on a trunking base member, said thickness-increasing device comprising a plate for locally superposing a portion of the trunking base member, and fixing means for fixing the thickness-increasing device on the trunking base member against lateral and longitudinal movement thereof, said thickness-increasing device is cooperable with an accessory for a trunking base member to enhances securement thereon.

6. The thickness-increasing device according to claim 5, wherein said device is of one-piece metal construction suitable configured and bent.

7. The thickness-increasing device according to claim 5, wherein said device defines a bracket adapted to be forwardly received on the trunking base member, perpendicularly to a lengthwise direction of the base member.

8. A thickness-increasing device for enhancing the securement of an accessory on a trunking base member, said thickness-increasing device comprising a plate for locally superposing a portion of the trunking base member, and fixing means for fixing the thickness-increasing device on the trunking base member, said fixing means comprising anchoring means for forcibly penetrating into the trunking base member.

9. The thickness-increasing device according to claim 8, further comprising a leg connected to said plate, said anchoring means comprising at least one anchor arm attached to said leg and at least one perforating claw.

10. The thickness-increasing device according to claim 9, wherein said leg extends generally transversely to said plate.

11. The thickness-increasing device according to claim 9, wherein said anchor arm extends generally in a plane parallel to said plate.

12. The thickness-increasing device according to claim 9, wherein said anchor arm has an open position making an angle with said plate, said anchor arm diverging from said plate in a direction away from said leg.

13. The thickness-increasing device according to claim 10, wherein said anchor arm is articulated to said leg.

14. The thickness-increasing device according to claim 12, wherein said claw is in a plane substantially parallel to said plate.

15. The thickness-increasing device according to claim 12, wherein said claw extends from a longitudinal edge of said anchor arm, said longitudinal edge forming a localized right-angle rim on said anchor arm.

16. The thickness-increasing device according to claim 9, wherein said claw includes at least one transverse barb.

17. The thickness-increasing device according to claim 9, wherein said claw has a pointed perforating end.

18. The thickness-increasing device according to claim 15, wherein said longitudinal edge of said claw defines a tapered blade like cutting edge.

19. The thickness-increasing device according to claim 9, wherein said claw has a longitudinal edge remote from said leg having a circular contour generally centered on the leg.

20. The thickness-increasing device according to claim 9, wherein said fixing means comprises two anchor arms disposed on respective opposite sides of said plate.

21. The thickness-increasing device according to claim 20, wherein respective said claws on the anchor arms are offset relative to each other.

22. The thickness-increasing device according to claim 20, wherein respective legs carry said anchor arms, further comprising two other lateral legs spaced from said legs.

23. The thickness-increasing device according to claim 8, further comprising a transverse stop lug at an end of said plate.

* * * * *